US007799589B2

(12) United States Patent
Akiyama et al.

(10) Patent No.: US 7,799,589 B2
(45) Date of Patent: Sep. 21, 2010

(54) OPTICAL WAVEGUIDE APPARATUS AND METHOD FOR MANUFACTURING THE SAME

(75) Inventors: Shoji Akiyama, Gunma (JP); Yoshihiro Kuboto, Gunma (JP); Atsuo Ito, Gunma (JP); Koichi Tanaka, Gunma (JP); Yuuji Tobisaka, Gunma (JP); Makoto Kawai, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 176 days.

(21) Appl. No.: 12/076,617

(22) Filed: Mar. 20, 2008

(65) Prior Publication Data
US 2009/0032831 A1    Feb. 5, 2009

(30) Foreign Application Priority Data
Apr. 12, 2007    (JP)    ............................. 2007-105178

(51) Int. Cl.
*H01L 21/00* (2006.01)
(52) U.S. Cl. .......................... 438/31; 438/29; 438/455; 438/458; 438/967; 257/E21.598
(58) Field of Classification Search .................. 438/29, 438/31, 455, 458, 967; 257/E21.598
See application file for complete search history.

(56) References Cited

U.S. PATENT DOCUMENTS 7,449,395 B2 * 11/2008 Allibert et al. .............. 438/459

FOREIGN PATENT DOCUMENTS

| JP | A-2002-323633 | 11/2002 |
| JP | A-2004-086868 | 3/2004 |
| JP | A-2005-157210 | 6/2005 |
| JP | A-2006-195371 | 7/2006 |
| WO | WO2005051068 A2 * | 6/2005 |

OTHER PUBLICATIONS

Chang et al., "Single-crystalline Silicon on Quartz (SOQ) Wafer by Ultra-low Temperature (100°C) Wafer Bonding and Thinning Approaches", Tamkang Journal of Science and Engineering, vol. 8, No. 3, pp. 207-210, 2005.*

* cited by examiner

*Primary Examiner*—Zandra Smith
*Assistant Examiner*—Christy L Novacek
(74) *Attorney, Agent, or Firm*—Oliff & Berridge, PLC

(57) ABSTRACT

An optical waveguide apparatus having a very simple structure that can modulate a signal light guided through an optical waveguide is provided. A photoresist 13 is applied to an upper side of an SOI film 12, a photoresist mask 14 is formed, and the SOI film in a region that is not covered with the photoresist mask 14 is removed by etching to obtain an optical waveguide 15 having a single-crystal silicon core. Further, a light emitting device capable of irradiating the single-crystal silicon core with a light having a wavelength of 1.1 µm or below is provided on a back surface side of a quartz substrate 20 to provide an optical waveguide apparatus. When the light emitting device 30 does not apply a light, the light guided through the optical waveguide 15 is guided as it is. However, when the light emitting device 30 applies a light to form each pair of an electron and a hole in the irradiated region 16, the light guided through the optical waveguide 15 is absorbed by the pair of an electron and a hole, thereby enabling switching (modulation) for turning ON/OFF an optical signal depending on presence/absence (ON or OFF) of application of the light from the light emitting device 30.

8 Claims, 5 Drawing Sheets

FIG.4
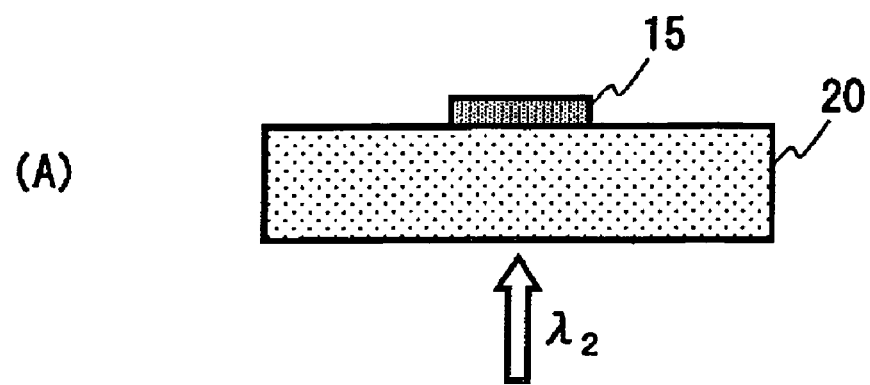
(A)
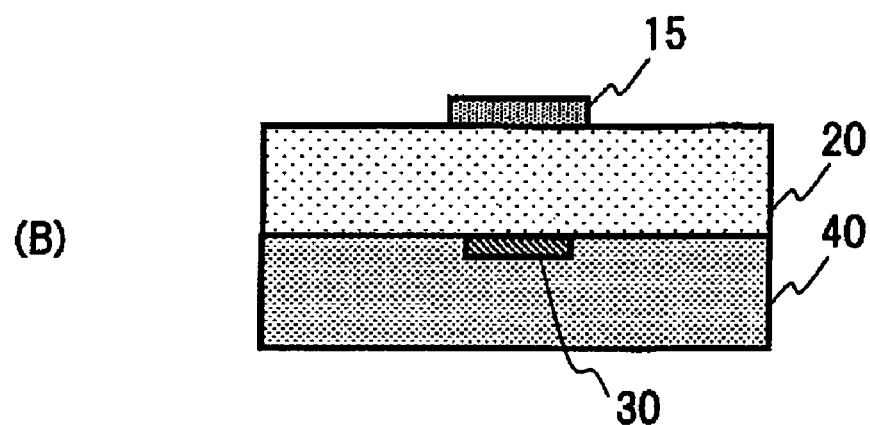
(B)
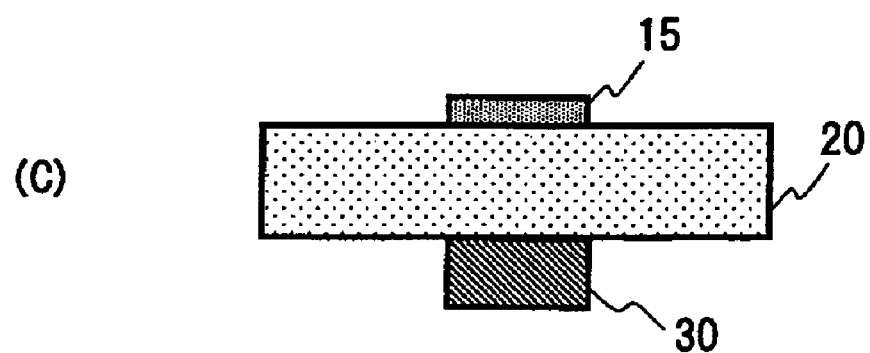
(C)

FIG.5
(A)
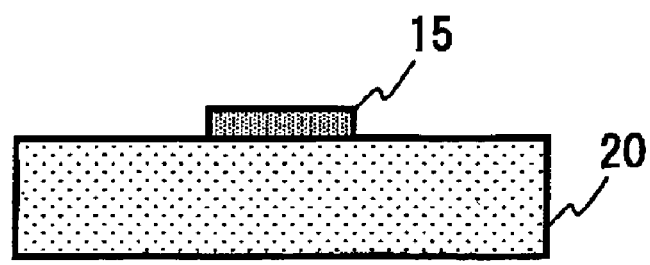
(B)
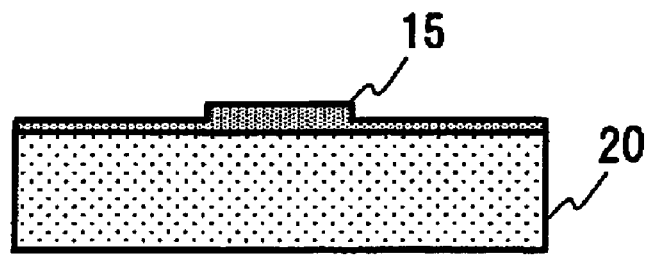
(C)
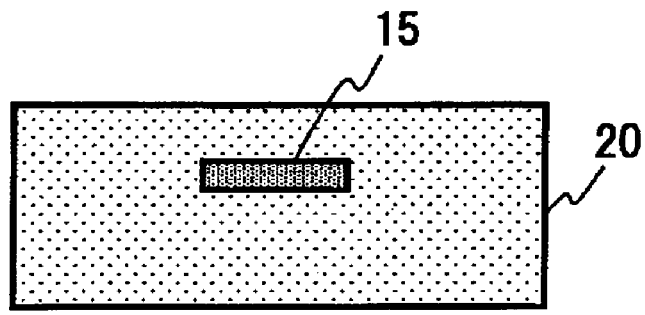

OPTICAL WAVEGUIDE APPARATUS AND METHOD FOR MANUFACTURING THE SAME

BACKGROUND OF THE INVENTION

1. Field of the Invention

The present invention relates to a technology of manufacturing an optical waveguide apparatus using an SOI substrate having a silicon thin film on a quartz substrate.

2. Description of the Related Art

With recent spread of the Internet, a high-speed and high-capacity optical communication system has been considerably developed. At the present day, FTTH (Fiber To The Home) which is an optical communication network configuration scheme that directly leads an optical communication cable to a personal residence of a general user has become widely used, and a study for enabling a light in a band of 1.55 µm as typified by a C band or an L band to be propagated through an optical waveguide provided on an optical integrated circuit has been advanced.

Among others, a study on a single-crystal silicon waveguide using an SOI substrate has been actively conducted (see, e.g., Japanese Patent Application Laid-open No. 2006-195371, Japanese Patent Application Laid-open No. 2005-157210, Japanese Patent Application Laid-open No. 2004-086868, Japanese Patent Application Laid-open No. 2002-323633 and others) because the SOI substrate is a substrate previously including a high-quality single-crystal silicon layer suitable for suppressing a propagation loss at minimum and a silicon oxide film that can be used as a clad layer of an optical waveguide.

However, in view of an optical communication system, a general-purpose platform of an optical integrated circuit on a practical level is not present under the present situation even though a fusion technology of not only a technology of using an SOI substrate to form a single-crystal silicon waveguide but also a modulation mechanism for modulating an optical signal or any other device (e.g., a receiving optics or an optical fiber) is important, and conventionally proposed technologies are all on a study stage. In particular, a technology of monolithically integrating a mechanism for modulating a light in a band of 1.55 µm with a light having a short wavelength (a wavelength: approximately 0.85 µm) as typified by GaAs is yet to be completed.

In view of such a problem, it is an object of the present invention to provide an optical waveguide apparatus having a very simple structure that can modulate a signal light guided through an optical waveguide and, more particularly an optical waveguide apparatus in which a mechanism that can modulate a light in a band of 1.55 µm with a light having a short wavelength as typified by GaAs is monolithically integrated.

SUMMARY OF THE INVENTION

To achieve such an object, an optical waveguide apparatus according to the present invention comprises: an optical waveguide which is provided on a front surface of a quartz substrate and has a single-crystal silicon core; and a light emitting device which is provided on a back surface side of the quartz substrate and capable of irradiating the single-crystal silicon core with a light having a wavelength of 1.1 µm or below.

The optical waveguide included in the optical waveguide apparatus according to the present invention is, e.g., a mesa type or a ridge type optical waveguide, and the light guided through the optical waveguide has a wavelength in a band of 1.55 µm, and the light emitting device is a GaAs-based light emitting device.

A method for manufacturing an optical waveguide apparatus according to the present invention comprises: a step A of implanting hydrogen ions into a front surface of a single-crystal silicon substrate; a step B of performing an activation treatment with respect to a front surface of at least one of a quartz substrate and the single-crystal silicon substrate; a step C of bonding the front surfaces of the quartz substrate and the single-crystal silicon substrate to each other; a step D of mechanically delaminating a silicon film from the single-crystal silicon substrate to form an SOI film on the front surface of the quartz substrate, thereby providing an SOI substrate; a step E of forming a single-crystal silicon core for an optical waveguide from the SOI film; and a step F of providing a light emitting device capable of irradiating the single-crystal silicon core with a light having a wavelength of 1.1 µm or below on a back surface side of the quartz substrate.

In the method for manufacturing an optical waveguide apparatus, a step G of flattening the SOI film may be provided after the step D, and a step H of forming a silicon oxide film that covers the single-crystal silicon core may be provided after the step E.

The activation treatment at the step B in the method for manufacturing an optical waveguide apparatus according to the present invention is, e.g., a plasma treatment or an ozone treatment.

In the present invention, the optical waveguide having the single-crystal silicon core is formed on the front surface of the quartz substrate that is transparent with respect to a light (a light having a wavelength of 1.1 µm or below) that is absorbed into the silicon crystal, and the device that emits the light having the above-explained wavelength is provided on the back surface of the same, thereby enabling modulation of the optical signal by the very simple apparatus structure.

BRIEF DESCRIPTION OF THE DRAWINGS

FIG. 4 are views for explaining a conformation of a light emitting device provided in the optical waveguide apparatus according to the present invention; and FIG. 5 are views for explaining a conformation of an optical waveguide included in the present invention.

DETAILED DESCRIPTION OF THE PREFERRED EMBODIMENTS

An optical waveguide apparatus and a manufacturing method thereof according to the present invention will now be explained hereinafter with reference to the drawings.

Figure 1:
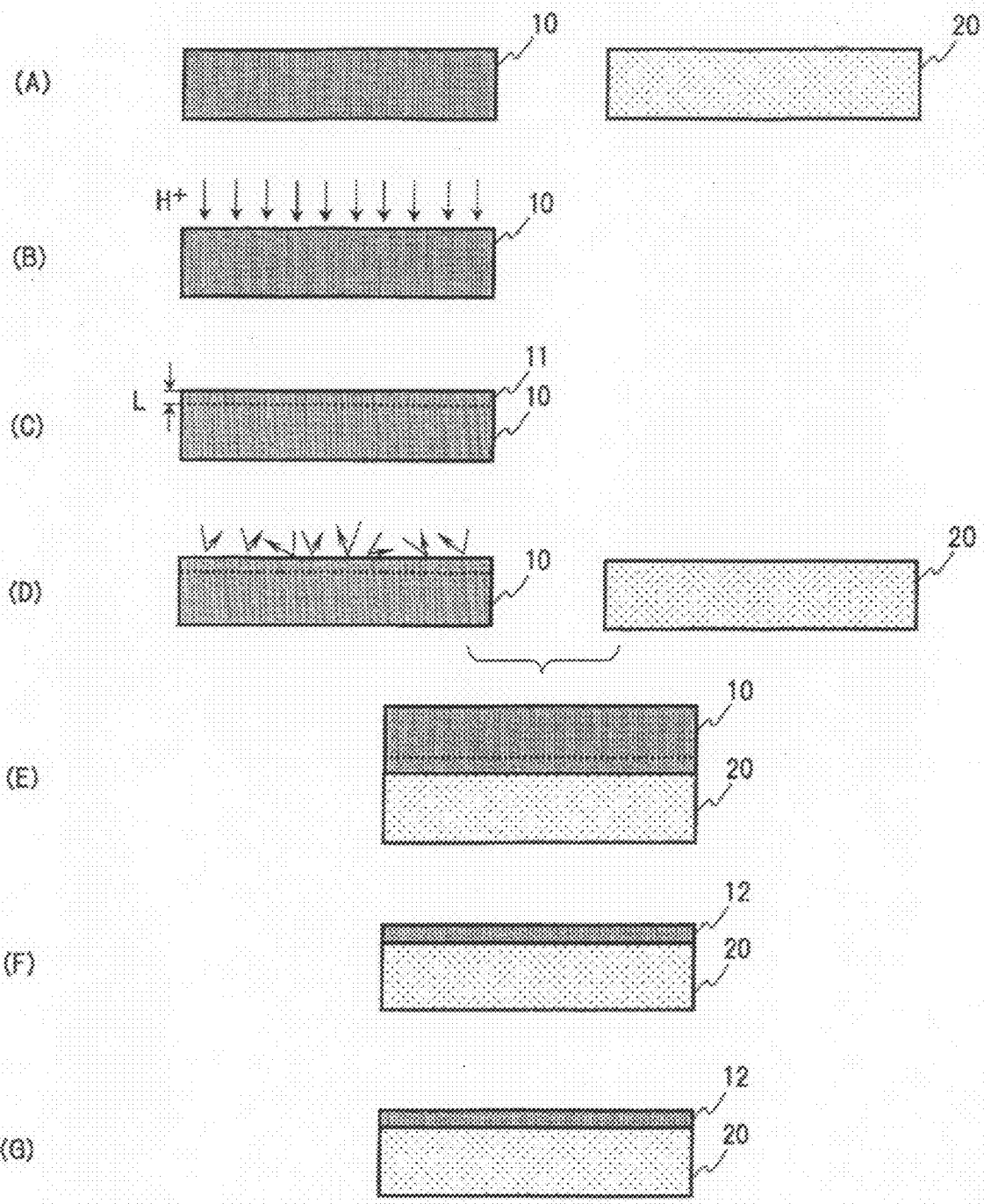
FIG. 1 are views for explaining a process example of a method for manufacturing an optical waveguide apparatus according to the present invention.

FIG. 1 are views for explaining a process example of a method for manufacturing an optical waveguide apparatus according to the present invention. It is to be noted that an oxide film is not provided on a front surface of a single-crystal silicon substrate used for bonding in this embodiment, but a silicon substrate having an oxide film formed on the front surface in advance may be used.

A silicon substrate 10 depicted in FIG. 1(A) is a bond wafer, and a quartz substrate 20 is a support substrate (a base wafer). The silicon substrate 10 is a generally commercially available single-crystal Si substrate grown by a CZ method or an FZ method.

The single-crystal Si substrate 10 and the quartz substrate 20 have the same diameter. When the same orientation flat (OF) as an OF provided on the single-crystal Si substrate 10 is likewise provided on the quartz substrate 20 and these substrates are bonded while matching these OFs with each other, this will be convenient for a later optical waveguide apparatus formation process.

First, hydrogen ions ($H^+$) are implanted into a front surface of the single-crystal Si substrate 10 (FIG. 1(B)). This ion implanted surface serves as a bonding surface (a joint surface) at a later step. Based on this hydrogen ion implantation, an ion implanted layer 11 having an average depth L is formed near the outermost front surface of the single-crystal Si substrate 10 (FIG. 1(C)). The ion implantation depth at this time is determined in dependence on a thickness of an SOI film to be finally delaminated.

It is to be noted that an insulator film such as an oxide film may be formed on the surface to be implanted ions of the single-crystal Si substrate 10 in advance and ion implantation may be carried out through this insulator film, which is usually performed to suppress channeling of implanted ions in a process of implanting the ions into an Si crystal. A heat treatment for remedying a damage is performed by a known technique after this hydrogen ion implantation.

After this treatment, a plasma treatment or an ozone treatment is performed with respect to a main surface of the single-crystal Si substrate 10 for the purpose of surface cleaning or surface activation (FIG. 1(D)). Such a surface treatment is carried out to remove an organic material on the front surface serving as the bonding surface or increase OH groups on the front surface, thereby achieving surface activation. It is to be noted that such a surface treatment may be performed with respect to the main surface of at least one of the single-crystal Si substrate 10 and the quartz substrate 20.

When performing this surface treatment based on the plasma treatment, the single-crystal Si substrate and/or the quartz substrate having the front surface cleaned by, e.g., RCA cleaning in advance is mounted on a sample stage in a vacuum chamber, and a plasma gas is introduced into the vacuum chamber to provide a predetermined degree of vacuum.

It is to be noted that, as the plasma gas type used in this process, there is an oxygen gas, a hydrogen gas, an argon gas, a mixed gas of these gases, or a mixed gas of a hydrogen gas and a helium gas. After introducing the plasma gas, a high-frequency plasma having a power of approximately 100 W is generated, the treatment is performed with respect to the front surface of the single-crystal Si substrate and/or the quartz substrate as a plasma treatment target for approximately 5 to 10 seconds, and then the treatment is terminated.

When performing the surface treatment based on the ozone treatment, the single-crystal Si substrate and/or the quartz substrate having the cleaned front surface is mounted on a sample stage in a chamber having an oxygen containing atmosphere, and a plasma gas such as a nitrogen gas or an argon gas is introduced into this chamber. Then, a high-frequency plasma having a predetermined power is generated, oxygen in the atmosphere is converted into ozone by using this plasma, and the treatment is carried out with respect to the front surface of the single-crystal Si substrate and/or the quartz substrate as a treatment target for a predetermined time.

The main surfaces of the single-crystal Si substrate 10 and the quartz substrate 20 subjected to the surface treatment are appressed against each other to be bonded (FIG. 1(E)). As explained above, since the front surface (the bonding surface) of at least one of the single-crystal Si substrate 10 and the quartz substrate 20 is activated because of the surface treatment, e.g., the plasma treatment or the ozone treatment, it has bonding strength that can sufficiently resist handling in chemical etching or mechanical polishing at a later step even in an appressed (bonded) state without heating (at a room temperature).

It is to be noted that a step of performing a heat treatment at a relatively low temperature (100 to 300° C.) in a state where the single-crystal Si substrate 10 and the quartz substrate 20 are bonded may be provided after the bonding step depicted in FIG. 1(E). This heat treatment step is mainly intended to obtain an effect increasing the bonding strength of the single-crystal Si substrate 10 and the quartz substrate 20.

It is to be noted that a main reason that the heat treatment temperature is set to 300° C. or below is a consideration on a thermal expansion coefficient difference between the single-crystal silicon and the quartz, a strain amount due to this thermal expansion coefficient difference, and a relationship between this strain amount and thicknesses of the single-crystal Si substrate 10 and the quartz substrate 20.

When the thickness of the single-crystal Si substrate 10 is substantially equal to that of the quartz substrate 20, there is a large difference between a thermal expansion coefficient of the single-crystal silicon ($2.33 \times 10^{-6}$/K) and a thermal expansion coefficient of the quartz ($0.6 \times 10^{-6}$/K). Therefore, when the heat treatment is performed at a temperature exceeding 300° C., cracks due to a thermal strain or delamination on the bonding surface may occur owing to a difference in rigidity between both the substrates, or the single-crystal silicon substrate or the quartz substrate may be broken in an extreme case. From such a viewpoint, 300° C. is selected as an upper limit of the heat treatment temperature.

After such a bonding step, an impact shock is given from the outside to disconnect Si—Si bonding in the ion implanted layer 11, and a single-crystal silicon thin film is mechanically delaminated along a crystal plane at a position corresponding to a predetermined depth (the average ion implantation depth L) near the front surface of the single-crystal Si substrate 10. As a result, an SOI substrate including an SOI film 12 on the main surface of the quartz substrate 20 can be obtained (FIG. 1(F)).

It is to be noted that there is no special limit in an atmosphere or a sample temperature when performing mechanical delamination, and delamination in an atmosphere at a room temperature can be carried out. Further, mechanical delamination may be effected in a state where a sample is maintained at a temperature causing no occurrence of, e.g., a serious thermal strain, a crack, or delamination on the bonding surface.

The thus obtained SOI film 12 has a uniform thickness in a quartz substrate surface, and an average value of RMS obtained by measuring a region of 10 μm×10 μm on the surface by an atomic force microscope (AFM) is as excellent as approximately 5 nm or below. However, when further flattening a surface of this SOI film 12, a treatment such as CMP polishing is effected to acquire a final SOI substrate (FIG. 1(G)).

Figure 2:
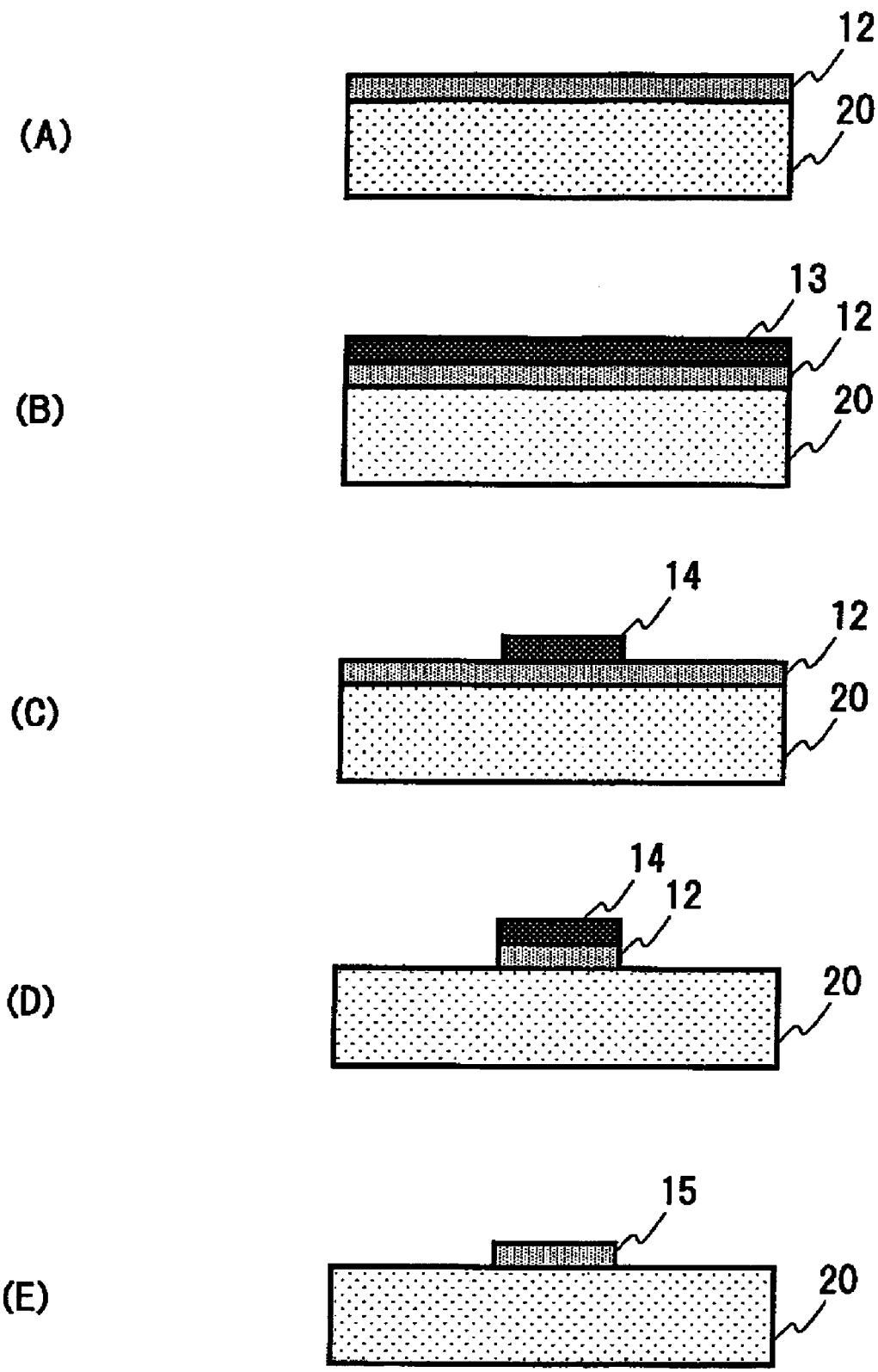
FIG. 2 are views for explaining a process example of forming an optical waveguide on an SOI substrate to provide the optical waveguide apparatus.

FIG. 2 are views for explaining a process example of forming an optical waveguide on the SOI substrate (FIG. 2(A)) obtained by the above-explained technique to provide an optical waveguide apparatus. First, a photoresist 13 is applied to the upper side of the SOI film 12 (FIG. 2(B)), and this is exposed to form a photoresist mask 14 that covers a region where an optical waveguide is formed (FIG. 2(C)). Furthermore, the SOI film in a region which is not covered with this photoresist mask 14 is removed by dry etching or wet etching (FIG. 2(D)), and the photoresist mask 14 is removed to obtain an optical waveguide 15 having a single-crystal silicon core (FIG. 2(E)). Moreover, a light emitting device that can irradiate the single-crystal silicon core with a light having a wavelength of 1.1 µm or below is provided on a back surface side of the quartz substrate 20 (not shown), thereby providing an optical waveguide apparatus.

Figure 3:
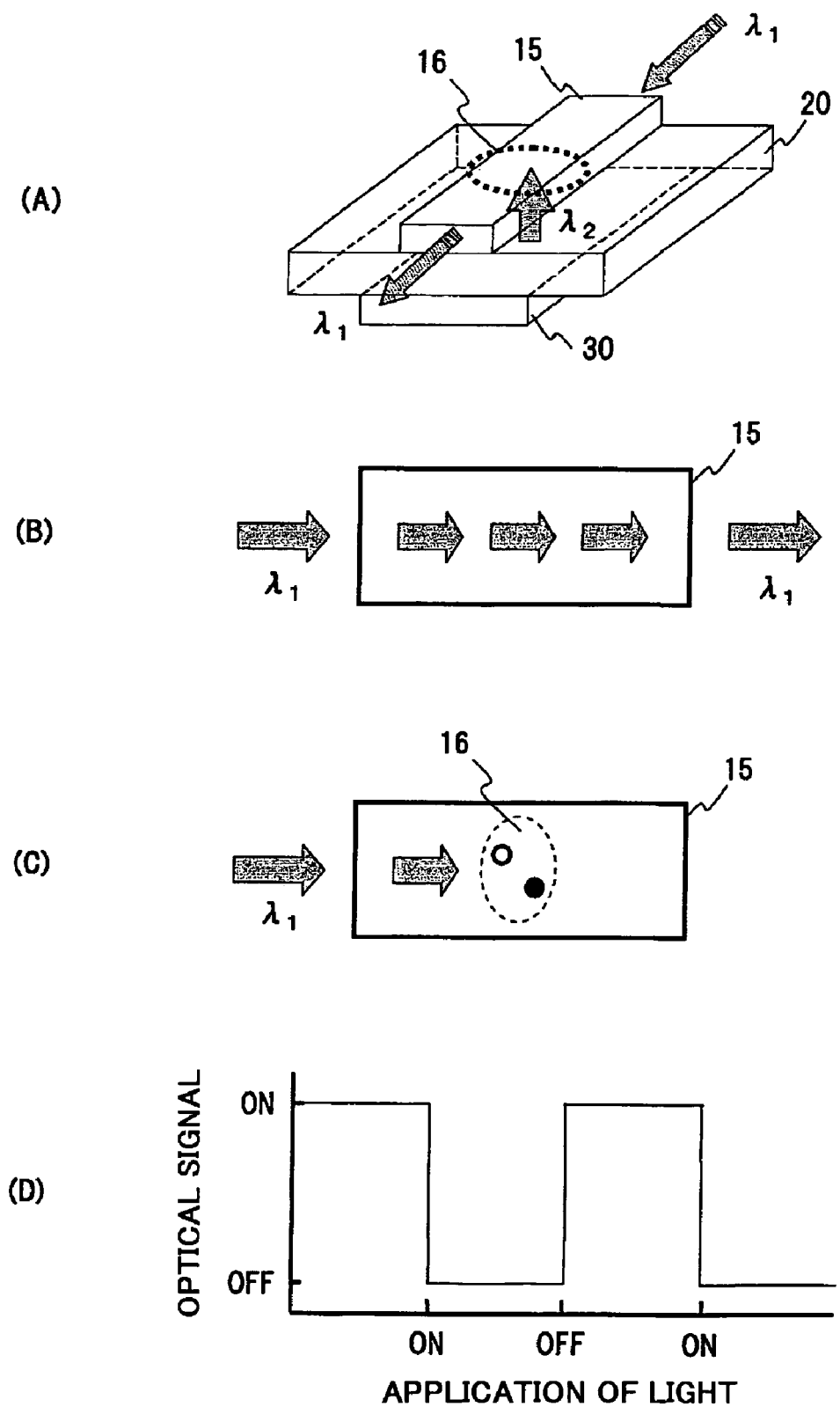
FIG. 3 are views for conceptually explaining an operation principle of the optical waveguide apparatus (an optical switch) according to the present invention.

FIG. 3 are views for conceptually explaining an operation principle of the optical waveguide apparatus (an optical switch) obtained through such steps. As shown in FIG. 3(A) as a perspective view, in this optical waveguide apparatus, an optical waveguide 15 having a single-crystal silicon core is provided on a front surface of the quartz substrate 20, and a light emitting device 30, e.g., a GaAs-based LED or LD that can irradiate the single-crystal silicon core with a light (a light having a wavelength of 1.1 µm or below) that is absorbed by a silicon crystal is provided on a back surface side of the quartz substrate 20. It is to be noted that, in this optical waveguide apparatus, the optical waveguide 15 is a ridge type optical waveguide.

A light ($\lambda_1$) in a band of 1.55 µm is guided through the optical waveguide 15, and the light emitting device 30 applies a light having a wavelength $\lambda_2$ to a single-crystal silicon core region of this optical waveguide 15. The light having the wavelength $\lambda_2$ applied to the single-crystal silicon core region form each pair of an electron and a hole in the single-crystal silicon core in this irradiated region 16 by free electron absorption.

Like a top view of the optical waveguide 15 shown in FIG. 3(B), when the light emitting device 30 does not irradiate the single-crystal silicon core region with the light, the light having the wavelength $\lambda_1$ in the 1.55-µm band which is guided through the optical waveguide 15 is guided as it is. However, like a top view of the optical waveguide 15 shown in FIG. 3(C), when the light emitting device 30 irradiates the single-crystal silicon core region with the light having the wavelength $\lambda_2$ to form each pair of an electron and a hole in the irradiated region 16, the light having the wavelength $\lambda_1$ in the 1.55-µm band guided through the optical waveguide 15 is absorbed by this pair of the electron and the hole (free electron absorption). That is, as shown in FIG. 3(D), assuming that a guiding state of the optical waveguide 15 is an ON state of an optical signal and a blocking state of the same is an OFF state, switching (modulation) for turning on/off the optical signal is enabled depending on presence/absence (ON or OFF) of application of the light from the light emitting device 30.

As explained above, according to the present invention, the optical waveguide having the single-crystal silicon core is formed on the front surface of the quartz substrate which is transparent with respect to a light (a light having a wavelength of 1.1 µm or below) absorbed into the silicon crystal, and the device that emits the light having the above-explained wavelength is provided on the back surface of the same, thereby enabling modulation of the optical signal by the very simple apparatus structure.

As a conformation of the light emitting device provided in such an optical waveguide apparatus, there are various types, e.g., a conformation where a light emitting device which is provided to be apart from the back surface of the quartz substrate 20 (not shown) as shown in FIG. 4(A), a conformation where any other substrate 40 having the light emitting device 30 formed thereon is provided on the back surface of the quartz substrate 20 by, e.g., a bonding method as shown in FIG. 4(B), or a conformation where an individual device such as a vertical cavity surface emitting laser (VCSEL) is arranged as shown in FIG. 4(C).

Additionally, the optical waveguide may be of a ridge type (FIG. 5(B)) or a buried type (FIG. 5(C)) besides a mesa type shown in FIG. 5(A). When the ridge type optical waveguide is adopted, in the etching process shown in FIGS. 2(C) to 2(D), it is good enough to finish etching before completely removing the silicon film in the region that is not covered with the photoresist mask 14. Further, when the buried type optical waveguide is adopted, it is good enough to provide a step of forming, e.g., a silicon oxide film that covers a single-crystal silicon core after the single-crystal silicon core is formed.

EXAMPLE

In this example, the optical waveguide is a mesa type optical waveguide.

Since a technique for fabricating an SOI substrate is the same as that described with reference to FIG. 1, a tautological explanation will be omitted. A single-crystal Si substrate 10 and a quartz substrate 20 each having a diameter of 6 inches were prepared, hydrogen ions ($H^+$) were implanted into a front surface of the single-crystal Si substrate 10 so as to provide an average depth L of approximately 0.5 µm, and then a damage remedying heat treatment was carried out. Thereafter, the front surface of this single-crystal Si substrate 10 was subjected to RCA cleaning, and this substrate was mounted on a sample stage in a vacuum chamber. A plasma treatment was carried out for approximately 10 seconds to activate the front surface of the single-crystal silicon substrate 10, and main surfaces of the single-crystal Si substrate 10 and the quartz substrate 20 were appressed against each other to be bonded at a room temperature. Then, an external impact shock was given to mechanically delaminate a single-crystal silicon thin film along a crystal plane at a position corresponding to a predetermined depth (an average ion implantation depth L) near the front surface of the single-crystal Si substrate 10, thereby providing an SOI substrate.

First, a positive type photoresist 13 was applied to an upper side of an SOI film 12 to form a uniform film thickness (approximately 15 µm) by using a spin coater (FIG. 2(B)), and this film was exposed to a g ray (a wavelength: 436 nm) to form a strip-like photoresist mask 14 having a width of 10 µm in a region where an optical waveguide is formed (FIG. 2(C)).

Further, the SOI film in a region that is not covered with this photoresist mask 14 was removed by wet etching (FIG. 2(D)). An etchant used here is obtained by adding an acetic acid for buffering to a mixed acid containing a hydrofluoric acid and a nitric acid. The SOI film was etched by using this etchant to form a mesa type optical waveguide 15 having a height of 0.5 µm, and then the photoresist mask 14 was removed (FIG. 2(E)). Furthermore, at last, a GaAs based vertical cavity surface emitting laser (VCSEL) that can irradiate a single-crystal silicon core with a light having a wavelength of 0.85 to 0.87 µm was provided on a back surface side of the quartz substrate 20 to provide an optical waveguide apparatus.

According to the present invention, the optical waveguide having the single-crystal silicon core is formed on the front surface of the quartz substrate that is transparent with respect to a light (a light having a wavelength of 1.1 µm or below) absorbed into a silicon crystal, and a device that emits the light having the above-explained wavelength is provided on the back surface of the same, thereby enabling modulation of an optical signal by the very simple apparatus structure.

What is claimed is:

1. A method for manufacturing an optical waveguide apparatus, comprising:

a step A of implanting hydrogen ions into a front surface of a single-crystal silicon substrate;

a step B of performing an activation treatment with respect to a front surface of at least one of a quartz substrate and the single-crystal silicon substrate;

a step C of bonding the front surfaces of the quartz substrate and the single-crystal silicon substrate to each other;

a step D of mechanically delaminating a silicon film from the single-crystal silicon substrate to form an SOI film on the front surface of the quartz substrate, thereby providing an SOI substrate;

a step E of forming a single-crystal silicon core for an optical waveguide from the SOI film; and a step F of providing a light emitting device capable of irradiating the single-crystal silicon core with a light having a wavelength of 1.1 μm or below on a back surface side of the quartz substrate, thereby manufacturing the optical waveguide apparatus in which modulating an optical signal between on and off is enabled depending on the presence or absence of the irradiated light from the light emitting device to the single-crystal silicon core.

2. The method for manufacturing an optical waveguide apparatus according to claim 1, comprising a step G of flattening the SOI film after the step D.

3. The method for manufacturing an optical waveguide apparatus according to claim 1, comprising a step H of forming a silicon oxide film that covers the single-crystal silicon core after the step E.

4. The method for manufacturing an optical waveguide apparatus according to claim 2, comprising a step H of forming a silicon oxide film that covers the single-crystal silicon core after the step E.

5. The method for manufacturing an optical waveguide apparatus according to claim 1, wherein the activation treatment at the step B is at least one of a plasma treatment and an ozone treatment.

6. The method for manufacturing an optical waveguide apparatus according to claim 2, wherein the activation treatment at the step B is at least one of a plasma treatment and an ozone treatment.

7. The method for manufacturing an optical waveguide apparatus according to claim 3, wherein the activation treatment at the step B is at least one of a plasma treatment and an ozone treatment.

8. The method for manufacturing an optical waveguide apparatus according to claim 4, wherein the activation treatment at the step B is at least one of a plasma treatment and an ozone treatment.

* * * * *